(12) United States Patent
Jörn et al.

(10) Patent No.: US 10,501,163 B2
(45) Date of Patent: Dec. 10, 2019

(54) PRESSURE BULKHEAD FOR AN AIRCRAFT FUSELAGE, AND AN AIRCRAFT COMPRISING SUCH A PRESSURE BULKHEAD

(71) Applicant: Airbus Operations GmbH, Hamburg (DE)

(72) Inventors: Paul Jörn, Hamburg (DE); Markus Müller, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 584 days.

(21) Appl. No.: 15/158,994

(22) Filed: May 19, 2016

(65) Prior Publication Data

US 2016/0340017 A1 Nov. 24, 2016

(30) Foreign Application Priority Data

May 20, 2015 (EP) .................................... 15168518

(51) Int. Cl.
*B64C 1/10* (2006.01)

(52) U.S. Cl.
CPC ...................... *B64C 1/10* (2013.01)

(58) Field of Classification Search
CPC .................. B64C 1/10; B64C 1/062
See application file for complete search history.

(56) References Cited

U.S. PATENT DOCUMENTS

| | | | |
|---|---|---|---|
| 2,813,692 A | 11/1957 | Peterson | |
| 4,296,869 A | 10/1981 | Jawad | |
| 5,062,589 A | 11/1991 | Roth et al. | |
| 6,213,426 B1 | 4/2001 | Weber et al. | |
| 6,378,805 B1 | 4/2002 | Stephan et al. | |

(Continued)

FOREIGN PATENT DOCUMENTS

| | | |
|---|---|---|
| CN | 101801783 A | 8/2010 |
| CN | 106167085 B | 10/2018 |

(Continued)

OTHER PUBLICATIONS

Extended European Search Report for Application No. EP 15 16 8518.7 dated Oct. 21, 2015.
European Search Report for Application No. EP 15 16 8516.1 dated Nov. 2, 2015.
Chinese Office Action for Application No. 201610338925.6 dated Nov. 16, 2017.
Chinese Office Action for Application No. 201610341958.6 dated Nov. 16, 2017.

(Continued)

*Primary Examiner* — Jessica B Wong
(74) *Attorney, Agent, or Firm* — Jenkins, Wilson, Taylor & Hunt, P.A.

(57) ABSTRACT

A pressure bulkhead for an aircraft fuselage including a sandwich structure defining a central axis and extending between a circumferential border area, the sandwich structure including an inner face sheet and an outer face sheet extending transverse to the central axis, and a core assembly sandwiched between the inner face sheet and the outer face sheet. The pressure bulkhead can receive pressure loads and can be used as a structural bearing element for receiving loads introduced by other structural parts. The inner face sheet and/or the outer face sheet has a corrugated shape. The distance between the outer face sheet and the inner face sheet increases and subsequently decreases from the border area to a central area about the central axis, forming a thickened area where the distance between the outer face sheet and the inner face sheet has a peak.

16 Claims, 2 Drawing Sheets

(56) References Cited

U.S. PATENT DOCUMENTS

| | | |
|---|---|---|
| 7,766,277 B2 | 8/2010 | Anderson et al. |
| 8,181,421 B2 | 5/2012 | Shaw |
| 8,444,089 B2 | 5/2013 | Mischereit et al. |
| 8,985,512 B1 | 3/2015 | Chan et al. |
| 10,259,557 B2 | 4/2019 | Jörn et al. |
| 2008/0063875 A1 | 3/2008 | Robinson et al. |
| 2008/0179459 A1 | 7/2008 | Garcia-Laja |
| 2010/0155533 A1 | 6/2010 | McKinnie et al. |
| 2010/0155537 A1* | 6/2010 | Barland .................. B64C 1/062 244/133 |
| 2010/0243806 A1 | 9/2010 | Vera-Villares et al. |
| 2010/0258673 A1 | 10/2010 | Garcia-Laja et al. |
| 2014/0042271 A1* | 2/2014 | Paci ........................ B29C 70/30 244/118.1 |
| 2014/0054419 A1 | 2/2014 | Grase et al. |
| 2015/0008285 A1 | 1/2015 | Zuardy et al. |
| 2016/0297510 A1 | 10/2016 | Folch-Cortes et al. |
| 2016/0340018 A1 | 11/2016 | Jörn et al. |
| 2017/0137107 A1 | 5/2017 | Zuardy et al. |

FOREIGN PATENT DOCUMENTS

| | | |
|---|---|---|
| DE | 10 2007 044 388 B4 | 8/2012 |
| DE | 10 2012 005 451 A1 | 9/2013 |
| EP | 3095688 B1 | 10/2017 |

OTHER PUBLICATIONS

Non-Final Office Action for U.S. Appl. No. 15/159,010 dated Dec. 26, 2017.

Second Chinese Office Action for Chinese Application No. 201610341958.6 dated Jul. 20, 2018.

Final Office Action for U.S. Appl. No. 15/159,010 dated Sep. 6, 2018.

Notice of Allowance for U.S. Appl. No. 15/159,010 dated Dec. 3, 2018.

Third Chinese Office Action for Application No. 201610341958.6 dated Apr. 4, 2019.

* cited by examiner

PRESSURE BULKHEAD FOR AN AIRCRAFT FUSELAGE, AND AN AIRCRAFT COMPRISING SUCH A PRESSURE BULKHEAD

CROSS-REFERENCE TO RELATED APPLICATION

This application claims priority to European Patent Application No. 15168518.7 filed May 20, 2015, the entire disclosure of which is incorporated by reference herein.

TECHNICAL FIELD

The present disclosure relates to a pressure bulkhead for an aircraft fuselage, as well as to an aircraft comprising such a pressure bulkhead.

BACKGROUND

The pressure bulkhead comprises a sandwich structure which defines a central axis and which extends between, i.e. is surrounded by, a circumferential border area which is configured for being mounted to a fuselage shell of an associated aircraft fuselage. The central axis preferably extends in parallel with respect to a longitudinal axis of an associated aircraft fuselage, or approximately in parallel with respect to the longitudinal axis.

The sandwich structure comprises an inner face sheet, an outer face sheet opposite the inner face sheet, and a core assembly which is sandwiched between the inner and outer face sheets. Both, the inner face sheet and the outer face sheet extend transverse, preferably perpendicular, with respect to the central axis. Preferably, the pressure bulkhead is installed or can be installed in an associated aircraft fuselage in such a manner that the inner face sheet faces the cabin and the outer face sheet faces away from the cabin. The core assembly connects the inner face sheet to the outer face sheet.

Similar pressure bulkheads are known from the prior art. DE 10 2012 005 451 A1 discloses a pressure bulkhead for an aircraft fuselage, comprising a sandwich structure including an inner face sheet, an outer face sheet and a foam core sandwiched between the face sheets. The sandwich structure has a lenticular cross section, wherein the thickness increases continuously from a border area to a central axis. However, such a lenticular cross section is optimized for pressure bulkheads which are under a uniform loading, i.e. a loading which results merely from the pressure difference between both sides of the pressure bulkhead. When also loads other than the pressure loads shall be absorbed and transferred by the pressure bulkhead, which can be desired in various cases, this cross sectional shape does not necessarily form an optimum with regard to stress distribution and required weight.

DE 10 2007 044 388 B4 discloses a pressure bulkhead for an aircraft fuselage formed as a sandwich structure having an inner face sheet, an outer face sheet, and a core sandwiched between the face sheets. The inner face sheet has an even cross section while the outer face sheet has a cross section which is flexed so that the distance between the outer face sheet and the inner face sheet gradually increases from the border area to a central axis. In the border area, where the sandwich structure is mounted to a fuselage shell, the distance between the outer and inner face sheets is constant up to a kink in the outer face sheet, from where on the outer face sheet extends away from the inner face sheet so that their distance increases linearly, when viewed from the border area to the central line. This linear increase runs until a second kink in the outer face sheet, from where on the outer and inner face sheets are in parallel again having a constant distance to one another, when viewed from the border area to the central line.

Such a cross section of the pressure bulkhead provides good strength characteristics for a uniform loading and a simple construction, while an integration and connection of cabin arrangements to the pressure bulkhead is facilitated. However, when loads other than pressure loads are to be received and transferred, this cross section is not always ideal.

SUMMARY

Therefore, an object of the present disclosure is to provide a pressure bulkhead for an aircraft fuselage, which in addition to receiving pressure loads can be used as a structural bearing element for receiving loads introduced by other structural parts.

This object is achieved in that the inner face sheet and/or the outer face sheet, when viewed in a radial cross section along the central axis, has a corrugated shape, wherein the distance between the outer face sheet and the inner face sheet increases and subsequently decreases from the border area to a central area about the central axis, preferably directly to the central axis. Thereby, a thickened area is formed, where the distance between the outer face sheet and the inner face sheet has a peak. In other words, the distance between the outer face sheet and the inner face sheet increases non-monotonically from the border area to the central area about the central axis. The corrugated shape within the meaning of the disclosure herein requires that the distance between the outer face sheet and the inner face sheet first increases and then, subsequently but not necessarily directly, decreases, when viewed along the radial cross section from the border area to a central area about the central axis. That means between increasing and decreasing also a portion with a constant distance between the inner and outer face sheets may be provided. The corrugated shape may provide a tangent continuous developing from the border area to the central area, but may also provide a discontinuous developing including kinks.

This developing of the inner and outer face sheets from the central axis to the border area may preferably correspond to the developing from the opposite part of the border area to the central axis, so that the central axis forms an axis of symmetry. However, the developing of the inner and/or outer face sheets may also be different on both sides of the central axis, when viewed along the radial cross section. Accordingly, the thickened areas on both sides of the central axis may extend in parallel to one another, when viewed in an axial cross section perpendicularly to the central axis, but may also extend transverse to one another, including an angle other than zero.

The radial cross section referred to here, might be only one particular radial cross section along the central axis at a particular location, but may also be the radial cross section of the pressure bulkhead along the central axis at different locations. The radial cross section is considered a cross section along the central axis, i.e. in parallel with the central axis and not transverse to the central axis. The central area is considered an area about the central axis, i.e. through which the central axis extends. The distance between the outer and inner face sheets at the central area might be constant, and a breakthrough or additional equipment might be provided in the central area. The extension of the central area perpendicular to the central axis might be small compared to the distance between the border area and the central axis, and might preferably be zero so that corrugated shape of the inner face sheet and/or the outer face sheet extends from the border area to the central axis, directly, i.e., the distance between the outer face sheet and the inner face sheet increases and subsequently decreases on its developing from the border area to the central axis, directly.

By such a corrugated shape of the inner face sheet and/or outer face sheet the thickened area is formed which may reinforce the sandwich structure of the pressure bulkhead at a particular desired location and direction, e.g. forming a reinforcement band. In such a way, beside the loads resulting from the pressure difference between both sides of the pressure bulkhead, also other loads, which can result e.g. from a vertical tail plane, an engine, or parts of the fuselage structure, can be introduced into the pressure bulkhead via structural parts, such as support elements, without the risk of local overload and without involving more structural weight as necessary.

In a preferred embodiment, when viewed in the radial cross section along the central axis, the inner face sheet has an even, i.e. straight, shape and the outer face sheet has the corrugated shape. Due to its even cross section, the inner face sheet forms an optimum cabin interface so that easy integration of cabin arrangement to the pressure bulkhead is possible, while by the corrugated shape of the outer face sheet the thickened area can still be formed in order to reinforce the sandwich structure at a particular location and direction.

In an alternative preferred embodiment, when viewed in the radial cross section along the central axis, the inner face sheet and the outer face sheet both have the corrugated shape. The inner and outer face sheets can be formed correspondingly and symmetric with respect to one another, but they can also deviate from one another in shape and orientation. In such a way, the thickened area can be increased or adjusted in its shape and position.

In a further preferred embodiment, the corrugated shape provides that the distance between the outer face sheet and the inner face sheet after increasing and subsequently decreasing increases again, when viewed along the radial cross section from the border area to the central area about the central axis. The distance between the inner and outer face sheets may be longer or shorter in the central area compared to the thickened area, depending on the particular requirements on the central area and the thickened area. For example, the central area may have a large thickness, i.e. a long distance between the inner and outer face sheets, when high pressure loads have to be absorbed, or when there is a reinforcement area or a breakthrough provided in the central area. The thickness of the thickened area has to be adjusted depending on the external loads to be introduced into the pressure bulkhead.

In yet a further preferred embodiment, the outer face sheet and/or the inner face sheet, when viewed in the radial cross section along the central axis, has a tangent continuous developing from the border area to the central area about the central axis. Due to the tangent continuous developing of the cross section of the outer and/or inner face sheet, an optimal stress distribution, and thus, an optimum strength to weight ration of the sandwich structure can be reached.

In an alternative preferred embodiment, the outer face sheet and/or the inner face sheet, when viewed in the radial cross section along the central axis, has a kinked, i.e. discontinuous developing from the border area to the central area about the central axis. Such a pressure bulkhead can be manufactured in a considerably simple manner.

According to another preferred embodiment, the radial cross section along the central axis is a first radial cross section along the central axis, and wherein a second radial cross section along the central axis is defined perpendicularly with respect to the first radial cross section. Preferably the first radial cross section extends in the horizontal direction and second radial cross section extends in the vertical direction, when the associated aircraft is in a normal position or parking position on the ground. In such a way, the thickened area that is present in the first radial cross section might extend as a reinforcement band in the vertical direction.

In particular, it is preferred that the inner face sheet and/or the outer face sheet, when viewed in the second radial cross section along the central axis, has a corrugated shape, wherein the distance between the outer face sheet and the inner face sheet increases and subsequently decreases from the border area to the central area about the central axis. In such a way, the thickened area that is present in the second radial cross section might extend as a reinforcement band in the horizontal direction. The corrugated shape in the second radial cross section might correspond to the corrugated shape in the first radial cross section, but might also deviate from the corrugated shape in the first radial cross section, depending on the loading conditions in both directions.

Alternatively, it is preferred that the inner face sheet and/or the outer face sheet, when viewed in the second radial cross section along the central axis, has a convex curved or kinked shape, wherein the distance between the outer face sheet and the inner face sheet monotonously increases from the border area to the central area about the central axis. In this case no thickened area is present in the second radial cross section.

According to yet another preferred embodiment, a structure element, such as a supporting profile or a beam, extends between the outer face sheet and the inner face sheet through the thickened area. By such structure elements the sandwich structure, in particular the thickened area, can be reinforced and external loads, i.e. loads other than the pressure loads, can be introduced into the sandwich structure.

In particular, it is preferred that the structure element comprises a connection member, such as a lug or a sleeve, which extends out of the sandwich structure external to the outer and inner face sheets, preferably at the border area, and which is configured for being connected to a support element of a further aircraft component such as an engine, a landing gear, a cargo fitting, a part of the fuselage shell, or an aerodynamic surface like a vertical tail plane, a horizontal tail plane or a wing. In such a way, loads resulting from these aircraft components can be transferred to the pressure bulkhead, so that the pressure bulkhead serves as a structural bearing element.

According to yet a further preferred embodiment, the inner face sheet and/or the outer face sheet comprises a metal material or a composite material. The metal material can preferably be an aluminum material, including aluminum alloys. The composite material can preferably be a carbon fiber reinforced plastic (CFRP) material, a glass fiber reinforced plastic (GFRP) material, or an aluminum—glass fiber—aluminum composite (GLARE®) material. Such materials can transfer considerably high bending moments and loads, while having considerably low weight.

According to yet a further preferred embodiment, the core assembly comprises a honeycomb core, a folded core, a foam core, or a built core including profile carriers such as I or Omega profiles. Additionally, the core assembly might be reinforced by pins. Such core assemblies can transfer considerably high shear forces, while having considerably low weight. The material of the core assembly is preferably chosen from metal, wood, aramide paper, CFRP, GFRP, or Polymethacrylimide (PMI) foam.

In a preferred embodiment, the sandwich structure, when viewed in an axial cross section perpendicular to the central axis, has a shape of a circle. In another preferred embodiment, the sandwich structure, when viewed in an axial cross section perpendicular to the central axis, has a shape which deviates from a circle. This shape may be any arbitrary but preferably curved shape, such as an ellipse. For conventional aircrafts this elliptic shape may have a semimajor axis in the vertical direction of an aircraft in a normal position on the ground. However, for flying wings aircrafts the semimajor axis may also extend in the horizontal direction.

According to yet a further preferred embodiment, a monolithic reinforcement area is provided at the border area, where the inner and outer face sheets are formed integrally and no core assembly is provided. Monolithic in this connection means that no core assembly is provided in this area but the inner and outer face sheets are integrated into one common structure. By such a reinforcement area the border area, which has to transfer the highest loads and bending moments, is particularly reinforced by deviating from a sandwich structure with a core in this area.

According to an alternative preferred embodiment, the core assembly, and preferably also the face sheets, extends through the border area. That means the border area is formed as a sandwich structure and is preferably formed integrally with, i.e. as a part of, the remaining sandwich structure between opposite sides of the border area. In such a way, the pressure bulkhead can be produced in a very simple manner and with a minimum weight.

In another preferred embodiment, a monolithic reinforcement area is provided at the central area around the central axis, where the inner and outer face sheets are formed integrally and no core assembly is provided. Monolithic in this connection means that no core assembly is provided in this area but the inner and outer face sheets are integrated into one common structure. By such a reinforcement area the central area around the central axis, which has to transfer high loads and bending moments, and which might also be weakened due to a possible breakthrough for passing equipment from one side of the pressure bulkhead to the other, can be particularly reinforced by deviating from the sandwich structure in this particular area.

According to a further preferred embodiment, a breakthrough is provided in the sandwich structure for passing equipment from one side of the pressure bulkhead to the other. By the term "equipment" in this connection it is referred to e.g. cables, pipes, or other conductors, as well as to any possible mechanic elements. In such a way, energy or information can be transferred through the pressure bulkhead inside or outside of the pressurized cabin. For example, electric energy generated by the auxiliary power unit (APU), which is arranged behind the pressure bulkhead in the tail area, can be transferred inside the cabin. In particular, it is preferred that the breakthrough is provided in the central area around the central axis. In the central area the breakthrough weakens the pressure bulkhead the least because of its symmetric position.

A further aspect of the present disclosure relates to an aircraft comprising an aircraft fuselage and a pressure bulkhead according to any of the before-described embodiments, which is installed in the aircraft fuselage, preferably in the tail area of the aircraft fuselage in order to separate the pressurized cabin from the unpressurized tail section. The features and advantages presented in connection with the pressure bulkhead apply vis-à-vis to the aircraft according to the disclosure herein.

BRIEF DESCRIPTION OF THE DRAWINGS

In the following preferred embodiments of the present disclosure is described in more detail by a drawing. The drawing shows in FIG. 1 a radial cross sectional view along the central axis of a first embodiment of the pressure bulkhead according to the disclosure herein, FIG. 2 a radial cross sectional view along the central axis of a second embodiment of the pressure bulkhead according to the disclosure herein, FIG. 3 a radial cross sectional view along the central axis of a third embodiment of the pressure bulkhead according to the disclosure herein, FIG. 4 a radial cross sectional view along the central axis of a fourth embodiment of the pressure bulkhead according to the disclosure herein, FIG. 5 a perspective view of the pressure bulkhead of FIG. 4, and FIG. 6 an axial cross sectional view perpendicularly to the central axis of a fifth embodiment of the pressure bulkhead according to the disclosure herein.

DETAILED DESCRIPTION

Figure 1:
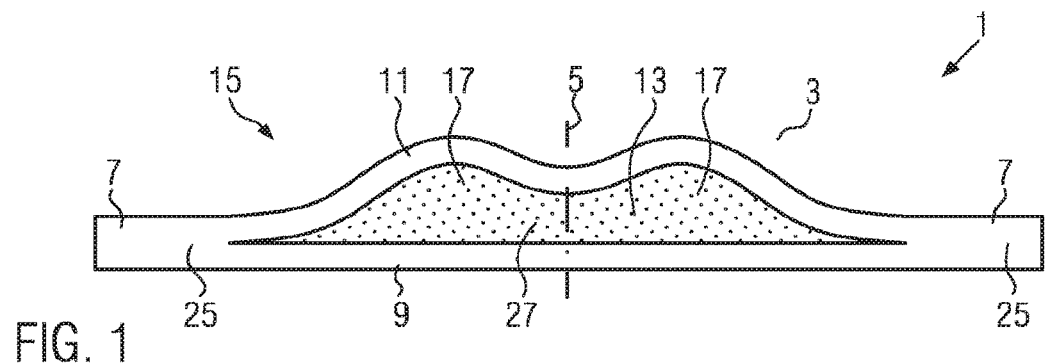

In FIG. 1 a first preferred embodiment of a pressure bulkhead 1 for an aircraft fuselage (not shown) according to the present disclosure is shown. The pressure bulkhead 1 is formed as a sandwich structure 3 which in its center defines a central axis 5, and which extends between a circumferential border area 7, i.e. between opposite portions of the circumferential border area 7. The border area 7 is configured for being mounted to a fuselage shell of an aircraft fuselage in which the pressure bulkhead 1 is to be installed.

The sandwich structure 3 comprises an inner face sheet 9, an outer face sheet 11 opposite the inner face sheet 9, and a core assembly 13 sandwiched between the inner and outer face sheets 9, 11. Inner and outer face sheets 9, 11 both extend transversely or even perpendicularly with respect to the central axis 5. The core assembly 13 is connected to the inner face sheet 9 as well as to the outer face sheet 11. When the pressure bulkhead 1 is installed in an aircraft fuselage the inner face sheet 9 faces the cabin, i.e. the pressure side of the associated aircraft fuselage, and the outer face sheet 11 faces away from the cabin to the tail of the associated aircraft fuselage.

The inner face sheet 9, when viewed in a radial cross section 15 along, i.e. in parallel with, the central axis 5, has an even shape. The outer face sheet 11, when viewed in the radial cross section 15 along the central axis 5, has a corrugated shape, wherein the distance between the outer face sheet 11 and the inner face sheet 9 first increases and then decreases on its developing from the border area 7 to the central axis 5. By this developing of the outer face sheet 11 between the border area 7 and the central axis 5 a thickened area 17 is formed where the distance between the outer face sheet 11 and the inner face sheet 9 has a peak. Further, the outer face sheet 11, when viewed in the radial cross section 15 along the central axis 5, has a tangent continuous developing from the border area 7 to the central axis 5. This developing of the inner and outer face sheets 9, 11 from the central axis 5 to the border area 7 corresponds to the developing from the opposite part of the border area 7 to the central axis 5, so that the central axis 5 forms an axis of symmetry.

The inner face sheet 9 and the outer face sheet 11 in the present embodiment are composed of GLARE material, but may also be composed of CFRP material, GFRP material, or aluminum material. The core assembly 13 in the present embodiment is composed of a foam core, but may also be composed of a honeycomb core, a folded core, or a built core.

At the border area 7 a monolithic reinforcement area 25 is provided, where the inner and outer face sheets 9, 11 are formed integrally and no core assembly 13 is provided.

Figure 2:
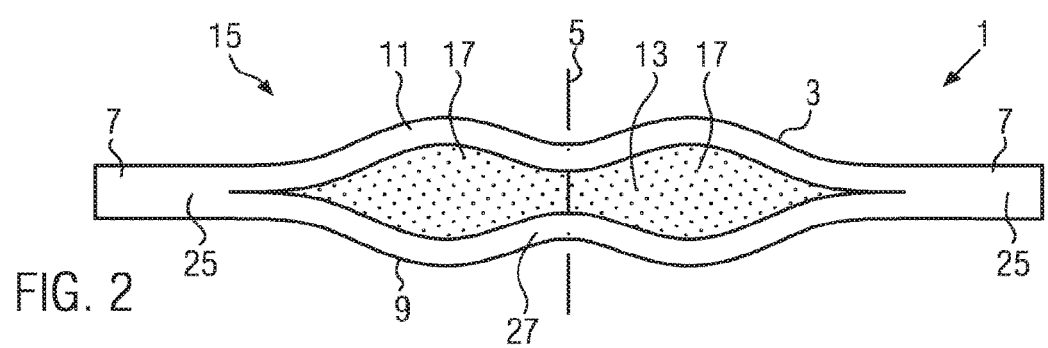

In FIG. 2 a second embodiment of the pressure bulkhead 1 according to the disclosure herein is illustrated, wherein corresponding features are referred to by corresponding reference numerals. The embodiment shown in FIG. 2 differs from the embodiment shown in FIG. 1 by the inner face sheet 9, when viewed in the radial cross section 15 along the central axis 5, instead of having an even shape has a corrugated shape, wherein the distance between the outer face 11 sheet and the inner face sheet 9 first increases and then decreases on its developing from the border area 7 to the central axis 5, correspondingly to the developing of the outer face sheet 11. In such a way, the outer face sheet 11 and the inner face sheet 9 extend symmetrically with respect to one another.

Figure 3:
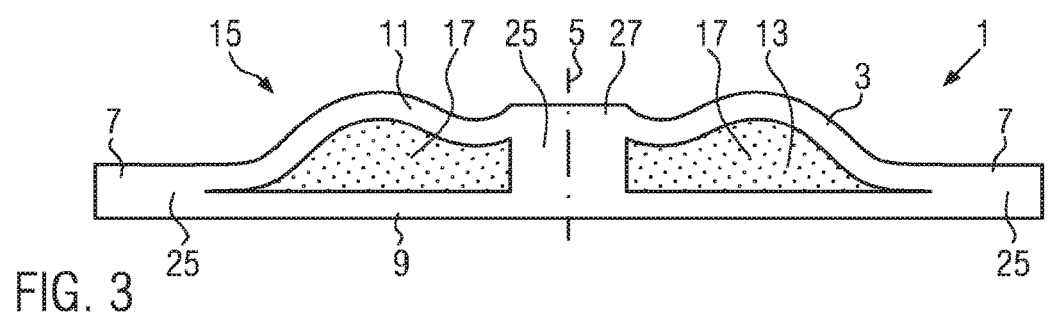

In FIG. 3 a third embodiment of the pressure bulkhead 1 according to the disclosure herein is illustrated, wherein corresponding features are referred to by corresponding reference numerals. The embodiment shown in FIG. 3 differs from the embodiment shown in FIG. 1 by the corrugated shape providing that the distance between the outer face sheet 11 and the inner face sheet 9 after increasing and subsequently decreasing increases again from the border area 7 to a central area 27 about the central axis 5. In the present embodiment the distance between the inner and outer face sheets 9, 11 is longer in the central area 27 about the central axis 5 than it is in the thickened area 17, but may also be shorter than in the thickened area 17. Further, a monolithic reinforcement area 25 is provided at the central area 27 around the central axis 5, where the inner and outer face sheets 9, 11 are formed integrally and no core assembly 13 is provided.

Figure 4:
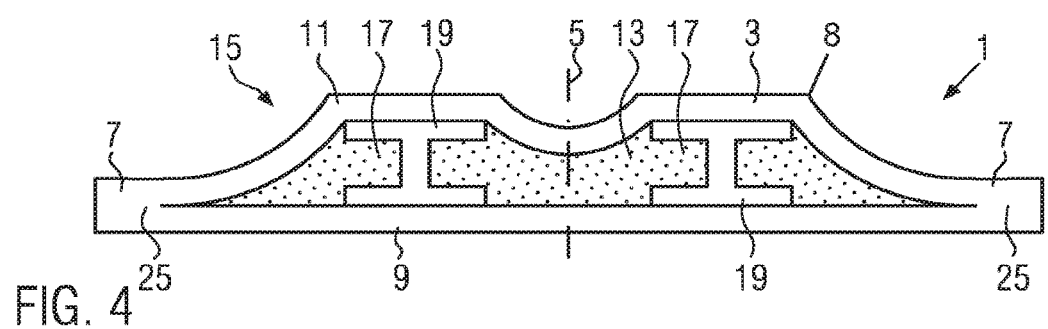

In FIG. 4 a fourth embodiment of the pressure bulkhead 1 according to the disclosure herein is illustrated, wherein corresponding features are referred to by corresponding reference numerals. The embodiment shown in FIG. 4 differs from the embodiment shown in FIG. 1 by the outer face sheet 11, when viewed in the radial cross section 15 along the central axis 5, instead of having a tangent continuous developing from the border area 7 to the central axis 5, has a discontinuous developing including kinks 8 from the border area 7 to the central axis 5. Further, structure elements 19 in the form of supporting profiles extend between the outer face sheet 11 and the inner face sheet 9 through the thickened areas 17 for reinforcing the sandwich structure 3 and for introducing external loads.

Figure 5:
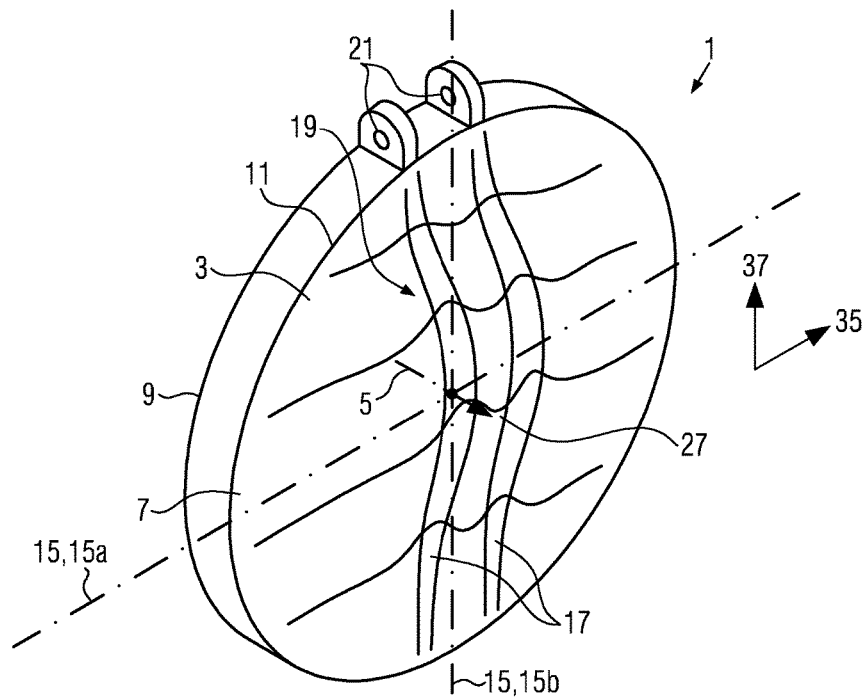

As shown in FIG. 5, which illustrates the same embodiment as FIG. 4, the structure elements 19 comprise connection members 21, which extend out of the outer and inner face sheets 11, 9 at the border area 7, and which are configured for being connected to support elements 23 of a vertical tail plane (not shown), an engine 39, or a fuselage shell (not shown) of an associated aircraft. As becomes apparent from FIG. 5, the radial cross section 15 is considered a first radial cross 15a section along the central axis 5, which in the present embodiment extends in a horizontal direction 35 of an associated aircraft that is in a normal position on the ground. A second radial cross section 15b along the central axis 5 is defined perpendicularly with respect to the first radial cross section 15a, so that the second radial cross section 15b extends in a vertical direction 37 of an associated aircraft in a normal position on the ground. When viewed in the second radial cross section 15b along the central axis 5, the outer face sheet 11 has a convex shape, wherein the distance between the outer face sheet 11 and the inner face sheet 9 increases tangent continuously from the border area 7 to the central axis 5.

Figure 6:
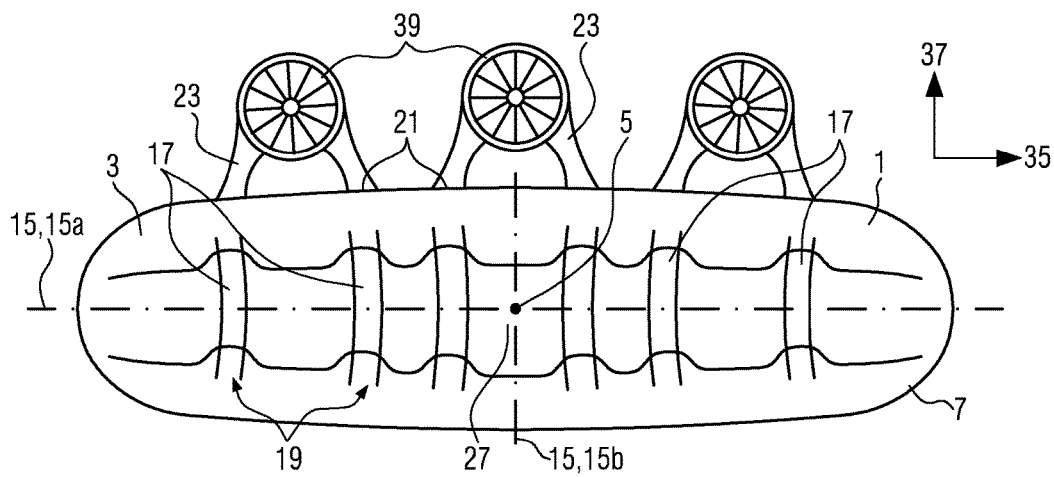

In FIG. 6 a fifth embodiment of the pressure bulkhead 1 according to the disclosure herein is illustrated, wherein corresponding features are referred to by corresponding reference numerals. The embodiment shown in FIG. 6 differs from the embodiment shown in FIG. 5 by being provided for a flying wing aircraft instead of a conventional aircraft, so that its dimensions in the axial cross section perpendicularly with respect to the central axis 5 are wide in the horizontal direction 35 of an aircraft in a normal position on the ground, compared to its dimensions in the vertical direction 37, since for the flying wing aircraft, fuselage and wings of the aircraft are integrated to one common structure. Further, a plurality of thickened areas 17 are provided next to each other extending in the vertical direction 37, each including a structure element 19 for absorbing loads introduced in the pressure bulkhead 1 by engines 39 for propelling the aircraft.

While at least one exemplary embodiment of the present invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A pressure bulkhead for an aircraft fuselage, comprising:
a sandwich structure defining a central axis and extending between a circumferential border area which is configured for being mounted to a fuselage shell;
the sandwich structure comprising:
an inner face sheet extending transverse to the central axis;
an outer face sheet opposite the inner face sheet, extending transverse to the central axis; and
a core assembly sandwiched between the inner face sheet and the outer face sheet;
wherein the inner face sheet or the outer face sheet, when viewed in a radial cross section through the central axis, has a corrugated shape, wherein a distance between the outer face sheet and the inner face sheet increases and subsequently decreases from the border area to a central area about the central axis, thereby forming a thickened area where the distance between the outer face sheet and the inner face sheet has a peak.

2. The pressure bulkhead according to claim 1, wherein, when viewed in the radial cross section through the central axis, the inner face sheet has an even shape and the outer face sheet has the corrugated shape.

3. The pressure bulkhead according to claim 1, wherein, when viewed in the radial cross section through the central axis, the inner face sheet and the outer face sheet both have the corrugated shape.

4. The pressure bulkhead according to claim 1, wherein, due to the corrugated shape, the distance between the outer face sheet and the inner face sheet, after increasing and subsequently decreasing, increases again in a direction oriented from the border area towards the central area about the central axis.

5. The pressure bulkhead according to claim 1, wherein the outer face sheet and/or the inner face sheet, when viewed in the radial cross section through the central axis, has a tangent continuous developing from the border area to the central area about the central axis.

6. The pressure bulkhead according to claim 1, wherein the outer face sheet or the inner face sheet, when viewed in the radial cross section through the central axis, has a kinked shape developing from the border area to the central area about the central axis.

7. The pressure bulkhead according to claim 1, wherein the radial cross section is a first radial cross section through the central axis, and wherein a second radial cross section through the central axis is defined perpendicularly with respect to the first radial cross section.

8. The pressure bulkhead according to claim 7, wherein the inner face sheet and/or the outer face sheet, when viewed in the second radial cross section through the central axis, has a corrugated shape, wherein the distance between the outer face sheet and the inner face sheet increases and subsequently decreases from the border area to the central area about the central axis.

9. The pressure bulkhead according to claim 7, wherein the inner face sheet or the outer face sheet, when viewed in the second radial cross section through the central axis, has a convex shape, wherein the distance between the outer face sheet and the inner face sheet monotonously increases from the border area to the central area about the central axis.

10. The pressure bulkhead according to claim 1, wherein a structure element extends between the outer face sheet and the inner face sheet through the thickened area.

11. The pressure bulkhead according to claim 10, wherein the structure element comprises a connection member, which extends external to the outer and inner face sheets, and which is configured for being connected to a support element of a tail plane, an engine, a landing gear, a cargo fitting, or the fuselage shell.

12. The pressure bulkhead according to claim 1, wherein the inner face sheet and/or the outer face sheet comprise a metal material or a composite material, and wherein the core assembly comprises a honeycomb core, a folded core, a foam core, or a built core.

13. The pressure bulkhead according to claim 1, wherein a monolithic reinforcement area is provided at the border area, where the inner and outer face sheets are formed integrally and no core assembly is provided.

14. The pressure bulkhead according to claim 1, wherein a monolithic reinforcement area is provided at the central area about the central axis, where the inner and outer face sheets are formed integrally and no core assembly is provided.

15. An aircraft comprising an aircraft fuselage and a pressure bulkhead which is installed in the aircraft fuselage, the pressure bulkhead comprising:

a sandwich structure defining a central axis and extending between a circumferential border area which is configured for being mounted to a fuselage shell;

the sandwich structure comprising:

an inner face sheet extending transverse to the central axis;

an outer face sheet opposite the inner face sheet, extending transverse to the central axis; and a core assembly sandwiched between the inner face sheet and the outer face sheet;

wherein the inner face sheet or the outer face sheet, when viewed in a radial cross section through the central axis, has a corrugated shape, wherein a distance between the outer face sheet and the inner face sheet increases and subsequently decreases from the border area to a central area about the central axis, thereby forming a thickened area where the distance between the outer face sheet and the inner face sheet has a peak.

16. The pressure bulkhead according to claim 12, wherein the inner face sheet and/or the outer face sheet comprise one or more of an aluminum material, a carbon fiber reinforced plastic (CFRP) material, a glass fiber reinforced plastic (GFRP) material, or an aluminum-glass fiber-aluminum composite (GLARE®) material.

* * * * *